Nov. 7, 1933.  B. T. ANDREN  1,933,954
FLASH WELDING
Filed June 5, 1930
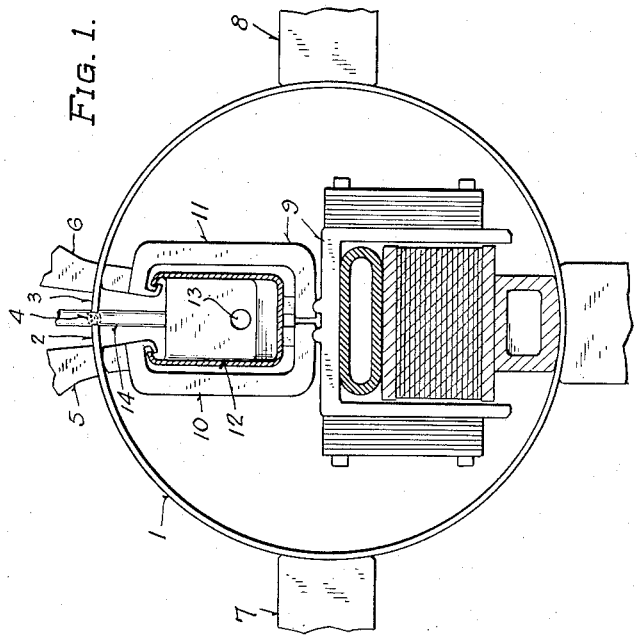
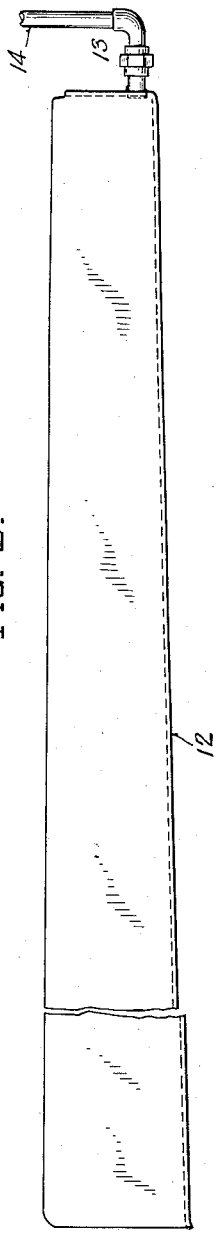
INVENTOR.
Birger T. Andren
BY
ATTORNEY.

Patented Nov. 7, 1933

1,933,954

UNITED STATES PATENT OFFICE 1,933,954

FLASH WELDING

Birger T. Andren, Milwaukee, Wis., assignor to A. O. Smith Corporation, Milwaukee, Wis., a corporation of New York Application June 5, 1930. Serial No. 459,379

4 Claims. (Cl. 219—6)

This invention relates to the flash welding of longitudinal seams and particularly to the disposition of metal flash resulting from the welding operation.

In the welding of articles by the flash welding method, an electric arc is established and maintained between the edges to be welded to heat the same to a welding temperature. The electric arc causes a portion of the metal at the edges to be projected therefrom in the form of fine sparks of incandescent particles having severe abrading properties and if permitted to collect on the operating parts of the machine, will cause a rapid wearing of the same.

The object of the invention is to collect and remove the metal flashed from the edges.

A further and more specific object of the invention is to provide a method and apparatus for effectively and quickly cooling the metal particles so that they may be readily removed from the machine.

The invention is illustrated in connection with the manufacture of long tubular articles by machines such as that disclosed in the application of Warren F. Heineman, William E. Crawford and myself, Serial No. 435,090, filed March 12, 1930.

Referring to the drawing:

Fig. 1 is an end view illustrating diagrammatically certain parts of the welding apparatus.

Fig. 2 is a longitudinal view of a flash trough adapted to be disposed within the tubular blank and provided with connections for the insertion of the cooling medium.

The reference character 1 denotes a tubular blank having longitudinally spaced edges 2 and 3 between which an electric arc 4 is established to heat the same to a welding temperature. To this end, the blank is provided with electrodes 5 and 6 extending longitudinally on each side of the welding cleft and clamping jaws 7 and 8 adapted to close about the blank and to move the edges relative to each other during the flashing operation.

Disposed within the blank and adapted to support the walls thereof during the movement of the edges is an arbor 9 having pivotal arms 10 and 11 adapted to contact with the walls of the blank beneath the electrodes.

For a detail description of the construction and operation of the welding machine, reference is made to the above mentioned application.

Disposed between the pivotal arms 10 and 11 is a trough 12 extending longitudinally of the blank directly beneath the welding cleft. The end of the trough at the feeding end of the machine is provided with connections 13 for supplying a suitable cooling fluid.

The vertical pipe 14 of the connections 13 is adapted to pass between the edges of the blank when the same is being inserted into the machine.

It is desirable to cause the cooling fluid to flow longitudinally through the trough during the flashing operation so that fresh cooling medium may be employed for quenching the metal flash and thereby preventing its sticking and welding to the bottom of the trough and also preventing the particles of flash from welding to each other.

The flow of fluid may be accomplished by inclining the trough downwardly from the feed end of the machine so that the flow is caused by gravity.

The invention has been described in connection with the manufacture of tubular articles, but it is understood that it may have various other applications and modifications without departing from the invention as defined in the appended claims.

I claim:

1. In flash welding, the steps of collecting and cooling the incandescent particles of molten metal flashed from the edges during the welding operation in a body of water, and thereafter removing the hardened metallic particles from the welding zone.

2. In flash welding, the steps of providing a flowing body of water beneath and in proximity to the welding cleft during the flashing operation to collect and cool the particles of molten metal flashed from the edges, and removing the hardened metallic particles from the welding zone.

3. In an apparatus for flash welding, a receptacle arranged beneath the welding cleft, and means to flow a liquid through the receptacle during the flashing operation to receive and cool the particles of molten metal flashed from the edges.

4. In an apparatus for flash welding a seam of substantial length, a trough arranged beneath the seam with one end of the trough higher than the other, the lower end of the trough having an opening for the escape of liquid therefrom, and means at the higher end of the trough for admitting liquid thereto.

BIRGER T. ANDREN.